United States Patent [19]

Davis et al.

[11] Patent Number: 4,644,521
[45] Date of Patent: Feb. 17, 1987

[54] OPTICAL MEMORY CARTRIDGE AND DRIVE APPARATUS

[75] Inventors: Marvin B. Davis; Michael V. Konshak, both of Colorado Springs; Christopher A. Pollard, Monument, all of Colo.

[73] Assignee: Laser Magnetic Storage International Company, Colorado Springs, Colo.

[21] Appl. No.: 765,426

[22] Filed: Aug. 14, 1985

[51] Int. Cl.⁴ .................. G11B 23/02; G11B 17/04; B65D 85/02
[52] U.S. Cl. ............................ 369/291; 206/444; 360/133; 369/77.2
[58] Field of Search ............... 369/291, 292, 77.2; 206/309, 312, 444; 360/133

[56] References Cited

U.S. PATENT DOCUMENTS

| | | | |
|---|---|---|---|
| 3,975,678 | 8/1976 | Jacques et al. | 206/444 |
| 4,222,487 | 9/1980 | Abel | 206/444 |
| 4,394,700 | 7/1983 | Edwards | 360/133 |
| 4,412,260 | 10/1983 | Stricklin et al. | 360/132 |
| 4,488,645 | 12/1984 | Yamaguchi | 206/312 |
| 4,501,357 | 2/1985 | Park | 206/312 |
| 4,519,500 | 5/1985 | Perchak | 206/312 |
| 4,525,758 | 6/1985 | Nakagawa et al. | 206/309 |
| 4,573,572 | 3/1986 | Kato et al. | 360/133 |

FOREIGN PATENT DOCUMENTS

2031215 4/1980 United Kingdom ............... 206/444

Primary Examiner—Steven L. Stephan
Attorney, Agent, or Firm—Joseph A. Genovese; Robert M. Angus

[57] ABSTRACT

An optical disk cartridge has two opposed cartridge sections held together by four locking assemblies. Each locking assembly includes a first locking jamb attached to one section, a second locking jamb attached to the other section, a locking detent and a spring. The jambs can be locking fingers parallel to and adjacent to one another when the cartridge sections are joined, in which case the detent surrounds the fingers as a sleeve, preventing the fingers from moving apart. The spring biases the detent into locking engagement with the fingers, keeping the cartridge closed. Alternatively, the jambs can be aligned slots in the cartridge top and bottom sections, with each detent having a protrusion that enters its associated slots. The spring and most of the detent are contained inside the cartridge. However, each detent includes a leg extended outside the cartridge through an aperture in the cartridge side wall. Also disclosed is a drive apparatus for use with the cartridge. Upper and lower rails mounted inside the housing contact flanges of the cartridge to guide the cartridge during its insertion into the drive. Stops in the housing contact the detents during insertion and move them out of locking engagement with their respective locking jambs. Following insertion, a movable platform in the housing is lowered, separating the cartridge sections from one another and moving the disk into drivable engagement with a drive spindle in the housing. Subsequently the platform can be raised to disengage the disk from the spindle and reunite the cartridge sections.

26 Claims, 15 Drawing Figures

FIG. 15

OPTICAL MEMORY CARTRIDGE AND DRIVE APPARATUS

BACKGROUND OF THE INVENTION

This invention relates to data storage devices including optical disks adapted for insertion into and removal from optical drives. Removable disks typically are housed in cartridges to reduce contamination and damage during storage and handling, and further to facilitate convenient yet accurate loading and removal of the disk into and out of the drive.

Prior art attempts to meet these requirements are shown, for example, in U.S. Pat. No. 4,394,700 to Edwards granted July 19, 1983. Edwards shows a mechanism for retaining a disk within a cartridge to prevent its rotation when not housed in a drive. Levers 72, each spring loaded by a coil spring 90, maintain the disk hub stationary in the cartridge. When the cartridge is loaded into a drive, release pins push levers 72, overcoming the force of coil springs 90 to release the disk for rotation.

U.S. Pat. No. 3,975,678 to Jacques et al granted Aug. 17, 1976, shows a cartridge having a top wall 42 and a bottom wall 41 connected by a hinge 43. Ribs 41a and 42a along the sides of the cartridge have angularly disposed confronting faces (see FIG. 9) that lock the cartridge top and bottom halves together until, when inserted into the drive, they are driven apart by a wedge element 46. Rollers 50 and 51 press against the cartridge top and bottom to reengage them as the cartridge is removed.

In U.S. Pat. No. 4,412,260 to Stricklin et al granted Oct. 5, 1983, a cartridge receiver mechanism undergoes a prescribed combination of linear and pivotal movement in order to properly align a disk for engagement with the spindle housed in the drive.

While these references show attempts to protect a removable disk and guide it toward accurate engagement with a drive spindle, none of these attempts meets the objects of the present invention which are: to reduce cartridge loading to two motion components, one parallel to the disk plane and the other parallel to the disk rotational axis; to totally separate opposed sections of a cartridge from each other and from the disk during insertion, to eliminate the possibility of the cartridge of interfering with disk rotation; and to provide a means for positively locking the cartridge sections together when the cartridge is removed from the drive, but to allow separation of the cartridge sections, when loaded, in the direction parallel to the disk rotational axis.

SUMMARY OF THE INVENTION

To achieve these and other objects, there is provided a memory cartridge assembly including a rotatable disk and a cartridge having first and second cartridge sections. When the sections are engaged, they enclose the disk within the cartridge, but are disengageable from one another to free the disk for rotational movement.

Means are provided for maintaining the sections releasably engaged with one another, including a plurality of first locking jambs integral with the first cartridge section, and a plurality of second locking jambs integral with the second cartridge section. When the cartridge sections are engaged, each second jamb is positioned proximate its associated first jamb. A locking detent is associated with each pair of first and second jambs, and a biasing means urges each detent into a locking engagement with its associated pair of locking jambs. Movement of the detents out of their locking engagement against the force of the biasing means disengages the first and second cartridge sections.

The jambs can comprise locking fingers, elongate and extended in a direction parallel to the plane of the disk, with the first and second fingers parallel to each other. The detent can then slide longitudinally of the fingers into and out of locking engagement. Alternatively, the jambs can comprise edges of slots formed in the cartridge sections, with a protrusion of the detent entering an associated pair of aligned slots to lockingly engage them.

Further, the cartridge advantageously includes a means to limit travel of the cartridge sections, when engaged or when nearly engaged, to movement perpendicular to the plane of the disk, with all locking fingers parallel. Such limiting means can include a first wall running along the perimeter of the first cartridge section and perpendicular to the plane of the disk, and a second wall running along the perimeter of the second cartridge section and perpendicular to the disk plane. Because of the limiting means, all locking fingers can be parallel, and the means in the drive for disengaging the locking fingers need act in only one direction.

As another feature of invention, the fingers, biasing means and bulk of each detent can be contained in the cartridge. In this event, each detent can have a leg extended away from the remainder of the detent and through an associated aperture in the cartridge, thus to permit movement of the detent from outside of the cartridge. This protects the locking assemblies from dust or accidental damage when the cartridge is out of the drive.

Another aspect of the present invention is a disk drive apparatus including a housing and means defining an anterior opening through which a disk cartridge is insertable into the housing. A spindle is mounted in the housing and is adapted to drivably engage a disk carried in the cartridge for rotation about a central axis. The housing contains a platform which is movable axially between first and second platform positions. Also in the housing are two guideways, a first guideway integral with the platform and a second guideway intergral with the housing.

The cartridge includes first and second sections separatable from one another. The first section has means for joining the first section with the first guideway as the cartridge is inserted, while the second cartridge section has means for joining it with the second guideway as the cartridge is inserted. The drive includes stop means positioned in the housing to prevent further insertion of the cartridge beyond a point where the disk is substantially aligned with and axially spaced apart from the spindle. Means are provided for moving the platform axially toward the spindle, thus to separate the first and second cartridge sections and carry the disk and first cartridge section toward the spindle until the disk is drivably engaged with the spindle. Further platform movement toward the second platform position separates the disk from the first cartridge section.

Preferably the guideways are defined by rails, two first rails mounted with respect to the platform determining the first guideway, and two second rails mounted to the housing and locating the second guideway. The means for joining the cartridge sections with their respective guideways can include two first flanges extended away from the first cartridge section, and two second flanges extending from the second cartridge section. The flanges contact their respective rails, thereby maintaining each cartridge section and its associated guideway.

The drive preferably has means for disengaging the cartridge detents from their associated locking fingers. Such a means can include stops mounted to the housing and positioned to engage the legs of the detents as the cartridge is inserted. Further insertion of the cartridge beyond such contact moves the detents relative to the cartridge out of locking engagement with the locking fingers, freeing the cartridge sections for separation when the platform subsequently is moved.

In combination, the drive and cartridge of the present invention insure protection for the disk when removed from the drive, and simplify the loading and unloading of the disk. The guideways restrict the cartridge to movement in the plane of the disk as it is inserted. Then, after full insertion, movement of the platform is perpendicular to the disk plane. This simple sequence virtually eliminates the possibility of disk or cartridge damage due to operator error. Further, the locking structure permits a total separation of the cartridge sections, by section movement in the direction normal to the disk plane. Restriction to such movement and complete separation of the disk from both cartridge sections minimize the potential for damage to the disk from contacting the cartridge. Yet when the cartridge is free of the drive, the travel limiting structure and locking assemblies protect the disk against dust and accidental damage, and protect the operator in the event that the optical disk is broken.

In The Drawings

These and other features and advantages of the invention will become apparent upon reading the following detailed description and upon reference to the drawings, in which.

Detailed Description of the Preferred Embodiment

Figure 1:
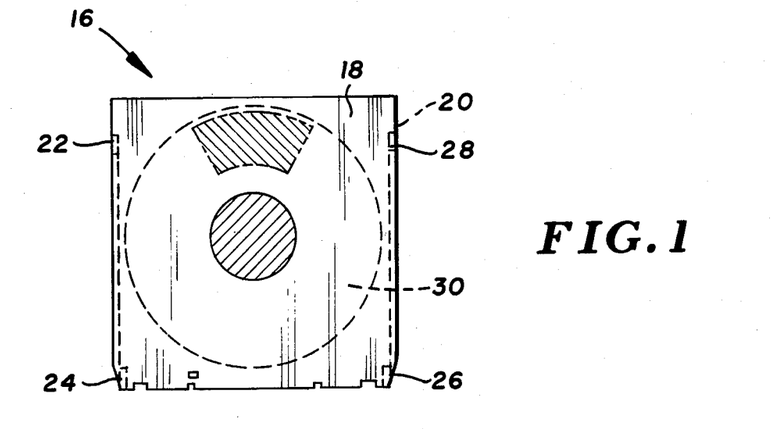
FIG. 1 is a top view of an optical memory cartridge constructed in accordance the present invention.
Figure 2:
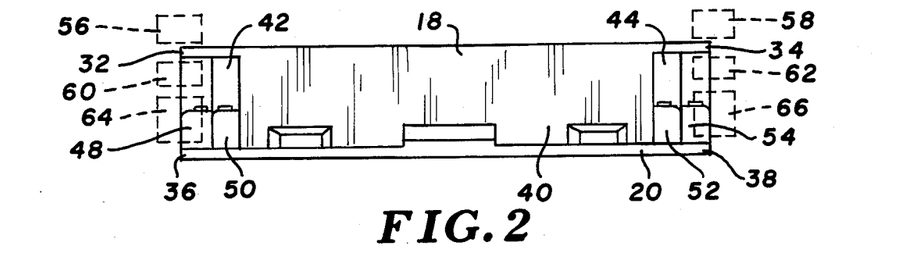
FIG. 2 is a forward end view of the cartridge.
Figure 3:
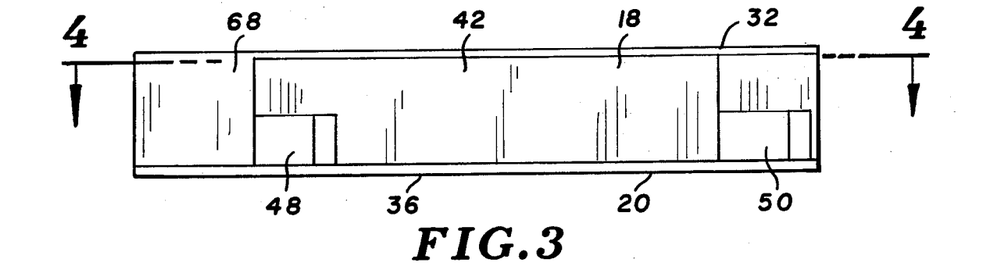
FIG. 3 is a side plan view of the cartridge.

Turning now to the drawings, particularly FIGS. 1-3, there is shown an optical drive cartridge 16 including a top section 18 and an opposed bottom section 20. Sections 18 and 20 are held together releasably by four locking assemblies including locking detents, two along either side of the cartridge. The locations of a first locking detent 22, second locking detent 24, a third locking detent 26 and a fourth locking detent 28 are shown in broken lines in FIG. 1.

Also shown in broken lines is an optical disk 30 contained in the cartridge. When the cartridge 16 is loaded into an optical disk drive, disk 30 is rotated, and a laser beam directed to the disk surface, thus to allow access to selective portions of the disk surface. Bottom section 20 includes a central opening through which a hub of disk 30 is allowed to drivably engage a spindle housed in the drive. Bottom section 20 has an opening through which a laser beam can be directed to read or write information on the disk surface. This opening is not germane to the present invention and thus is not illustrated.

From FIG. 2 it is seen that cartridge 16 has a plurality of flanges on opposite sides and extended horizontally outward. These include a first top flange 32 and a second top flange 34 of top section 18. Likewise, bottom section 20 has a first bottom flange 36 and a second bottom flange 38.

Cartridge 16 has an outside perimeter wall comprised of a plurality of ribs of top section 18, perpendicular to its major surface and to the plane of disk 30. These ribs include a top section front rib 40, a first side rib 42, a second side rib 44, and a back rib 46 (see FIG. 4). The forward-facing portions of first and second side ribs 42 and 44 are shown in FIG. 2.

Each of locking detents 22, 24, 26 and 28 includes an elongate, forwardly extending leg. Shown in FIG. 2 are a first leg 48, a second leg 50, a third leg 52 and a fourth leg 54. Each leg extends outside cartridge 16 through an associated aperture formed in one of the forward-facing portions of side ribs 42 and 44. The broken lines in the figure indicate the locations of first and second top rails 56 and 58, and first and second intermediate rails 60 and 62, and first and second bottom rails 64 and 56 when the cartridge is loaded into a drive.

As seen in FIG. 3, top flange 32 and bottom flange 36 run the length of cartridge 16 except for a rear portion 68 of first side rib 42. The second top and bottom flanges similarly extend along the opposite side of the cartridge. Also shown is how first leg 48 and second leg 50 protrude forwardly of their respective apertures when cartridge 16 is not loaded in a disk drive. The third and fourth legs extend similarly.

Figure 4:
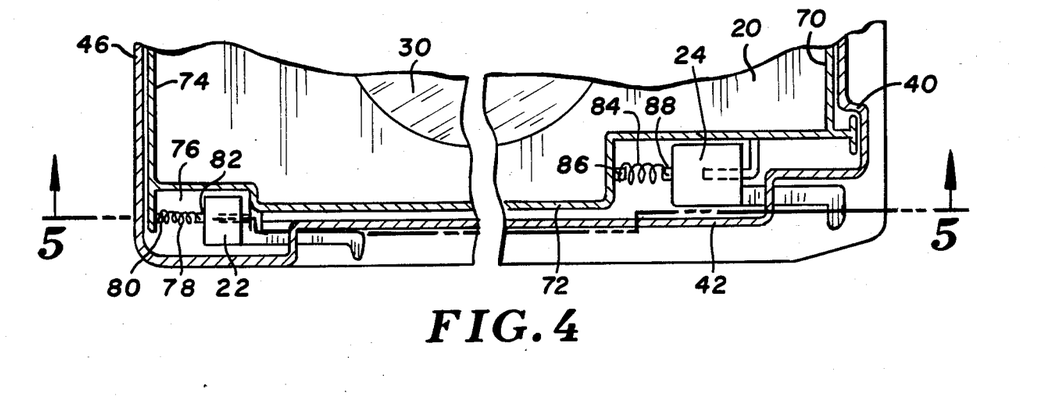
FIG. 4 is a partial sectional view taken along the line 4—4 in FIG. 3.

FIG. 4 illustrates the locking assemblies in greater detail, and also shows a plurality of ribs of bottom section 20 which, in cooperation with ribs 40, 42, 44 and 46 of top section 18, define channels which guide locking detent movement and provide a nesting engagement of the top and bottom covers. The section from FIG. 3 is taken along the inside surface of the top of cartridge 16, thus to show the outer perimeter wall or ribs of top section 18 in cross section, while also showing the top of an inside, complementary wall formed by a plurality of bottom section ribs, including a bottom section front rib 70, a first side rib 72, a second side rib (not shown) and a back rib 74.

The spacing between adjacent top section and bottom section ribs is exaggerated for clarity in illustration. Actually, the adjacent ribs virtually contact one another, providing for a nesting engagement of top and bottom sections 18 and 20, in that while they are engaged or nearly engaged, movement of the top and bottom sections relative to one another is permitted in only direction, namely the direction perpendicular to the plane of disk 30.

Near the rear of the cartridge, side ribs 42 and 72 form an elongate first channel 76 which confines movement of first locking detent 22 to a forward or rearward sliding. A first coil spring 78, mounted at one end to a first knob 80 extended from back rib 74, and at the other end to a second knob 82 extended from first detent 22, continually urges the first locking detent forward. A second coil spring 84, mounted between third and fourth knobs 86 and 88, similarly biases the second locking detent.

Figure 5:
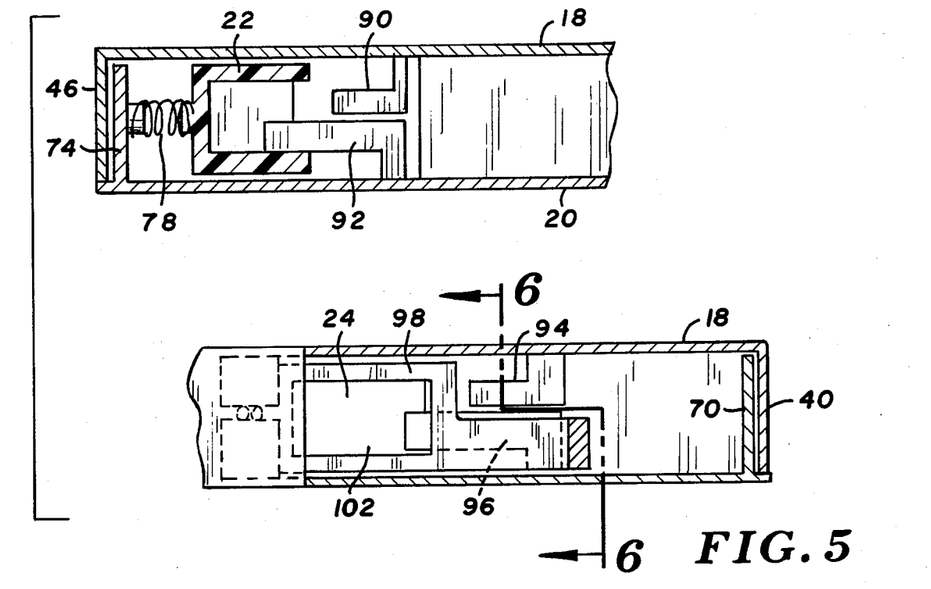
FIG. 5 is a partial sectional view taken along the line 5—5 in FIG. 4.

FIG. 5 illustrates the first and second locking assemblies in greater detail. When cartridge 16 is fully loaded into a disk drive, the detents are moved rearwardly with respect to the cartridge against the force of their associated coil springs. This frees cartridge sections for complete separation from one another as later explained.

When the cartridge is free of the drive, however, each locking detent maintains the cartridge sections engaged by holding together two associated locking fingers. For example, first locking detent 22 holds together a first upper locking finger 90 mounted to top section 18, and a first lower locking finger 92 mounted to bottom cartridge section 20. Detent 24 similarly cooperates with second upper and lower locking fingers 94 and 96. The upper and lower locking fingers are elongate, parallel to the plane of the disk and parallel to each other, and further extended in the rearward direction, thus to accommodate the forward and rearward sliding motion of the associated detent.

Figures 6, 7, 8:
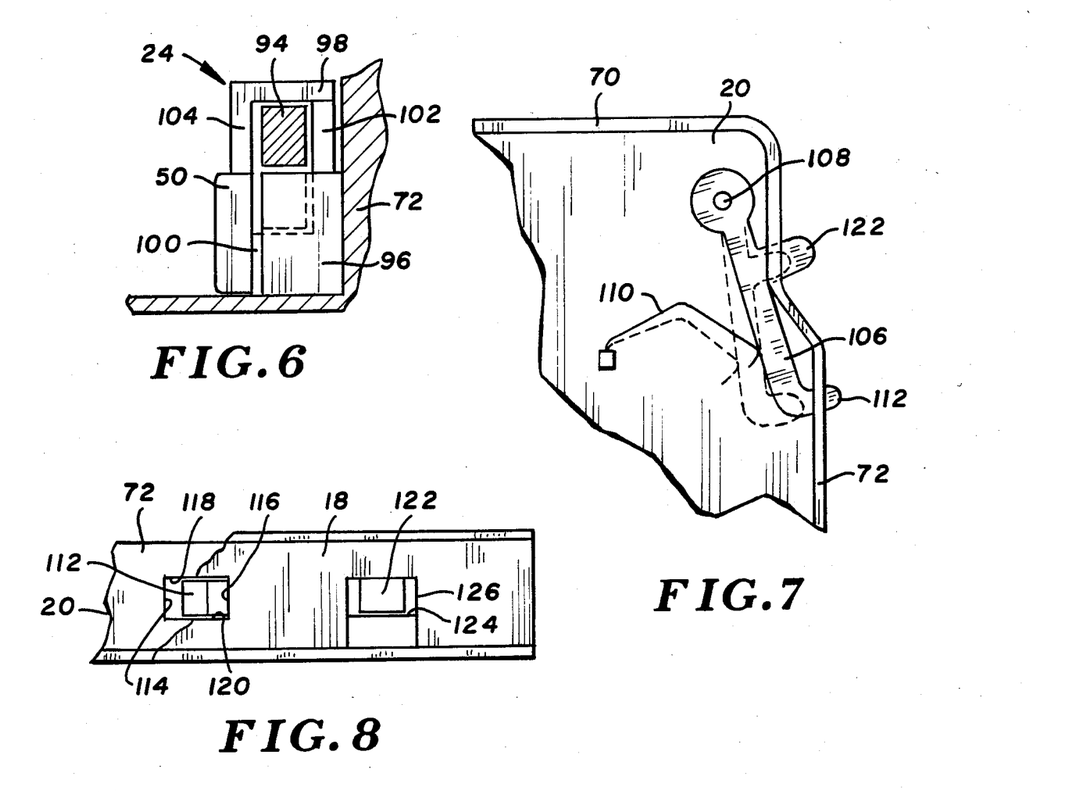
FIG. 6 is a sectional view taken along the line 6—6 in FIG. 5.
FIG. 7 is a partial view of the cartridge, showing an alternative locking detent.
FIG. 8 is a partial side view of the cartridge showing the alternative locking detent.

As seen in FIG. 6, second detent 24 includes a top portion 98, a bottom portion 100, an inside wall 102 and a column 104 spaced apart outwardly from the inside wall. These parts of detent 24 form a sleeve which encloses the upper and lower locking fingers when the locking detent is in its forward position. The remaining detents are similar. When the cartridge is loaded into a disk drive, locking detent 24 is moved sufficiently rearwardly in cartridge 16 such that upper locking finger 94 is free of the detent. Locking fingers 94 and 96 are then no longer confined against vertical movement relative to each other. The remaining three locking assemblies function in the same manner, so that when all four detents are held in their rearward positions, top section 18 and bottom section 20 may be disengaged. A plurality of stops can be mounted to a disk drive housing and positioned such that as cartridge 16 is inserted into the drive, all locking detents move in concert relative to the cartridge.

FIGS. 7 and 8 illustrate an alternative locking detent 106 mounted pivotally to cartridge bottom section 20 at a pivot 108. A leaf spring 110, attached to section 20, continually urges detent 106 counter clockwise as seen in FIG. 7, forcing a protrusion 112 of the detent through first and second aligned slots 114 and 116 of cartridge sections 18 and 20, respectively. When it contacts a bottom edge 118 of first slot 114, and a top edge 120 of second slot 116, protrusion 112 prevents cartridge sections 18 and 20 from separating. Thus detent 106, in cooperation with three similar detents not shown, maintains cartridge 16 closed.

Locking detent 106 also has a leg 122 extended outside of the cartridge through openings 124 and 126 in cartridge sections 18 and 20, respectively. A stop in a drive housing contacts leg 122 to pivot detent 106 against the force of leaf spring 110 and out of locking engagement with top and bottom edges 120 and 118, thus freeing cartridge sections 18 and 20 for separation from one another. As seen in FIG. 7 (broken lines), protrusion 112 is completely clear of slots 114 and 116, while leg 122 still extends slightly outside of the cartridge.

The alternative locking mechanism includes three additional locking detents substantially identical to detent 106. With stops properly positioned in a drive, all four detents are pivoted, during cartridge insertion, out of locking engagement with their associated slot edges.

Figure 9:
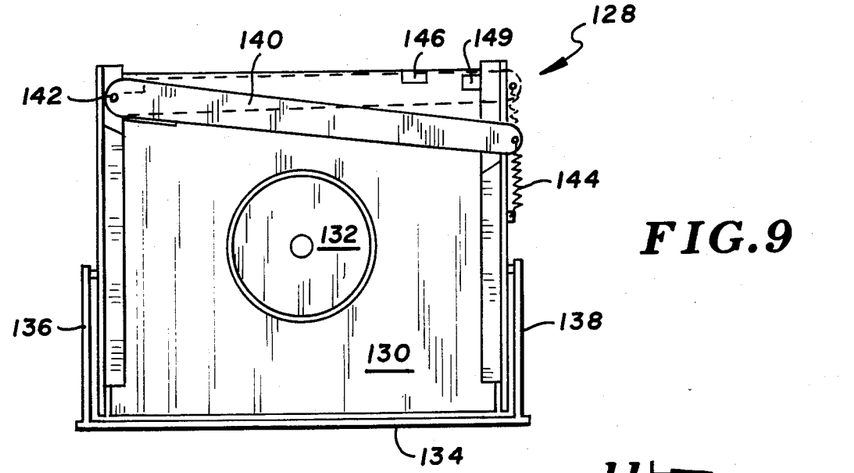
FIG. 9 is a schematic top view showing an optical disk drive constructed in accordance with the present invention.

FIG. 9 shows an optical drive 128 adapted for use with cartridge 16. Mounted within the housing of drive 128 is a platform 130 movable upwardly and downwardly with respect to the housing. Near the center of platform 130 is a drive spindle 132 adapted to drivingly engage the disk contained within cartridge 16. Cartridges are loaded into the drive through a door 134 pivotally mounted to the drive housing through first and second actuator arms 136 and 138 on opposite sides of the housing.

On opposite sides of the drive are first top rail 56 and second top rail 58. Portions of the top rails are broken away to reveal first immediate rail 60 and second immediate rail 62. Also shown is an eject member comprising a lever 140 pivotally mounted to the disk drive housing at pivot point 142. The eject lever is maintained in a forward position, and acute angle relation with respect to first top rail 56, by a coil spring 144 mounted to the eject lever and to the housing. When a cartridge is inserted into drive 128, lever 140 is moved against the force of spring 144 into its loaded position as shown by the broken lines. As it is moved into the loaded position, lever 140 contacts a release member comprising an eject spring 146 and moves it rearwardly as is later explained. First and second stops 147 and 149 are mounted to the rear of platform 130. The forward ends of rails 64 and 66 function as two additional stops.

Figure 10:
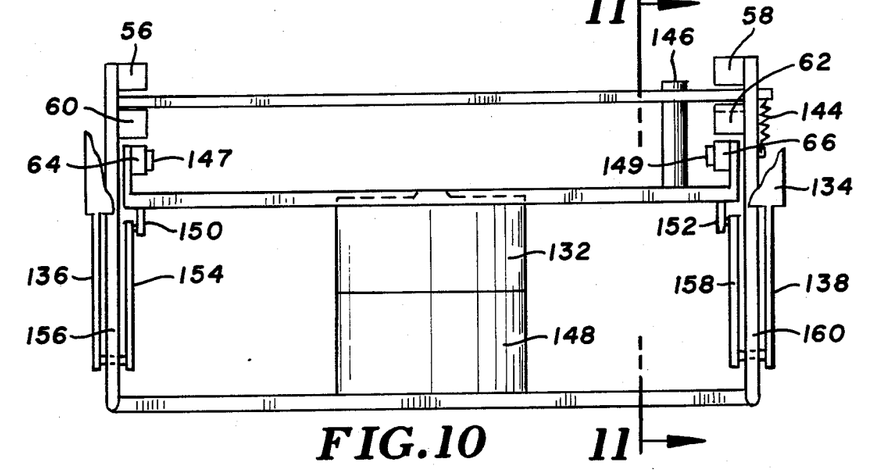
FIG. 10 is a forward plan view of the cartridge.

In FIG. 10, most of door 134 is cut away to more clearly show spindle 132, and a motor 148 for rotating spindle 132 about a central axis. Platform 130 is shown in its raised position above spindle 132. First and second bottom rails 64 and 66 are mounted with respect to the platform at opposite sides thereof, and are vertically aligned with their respective intermediate and top rails. Also shown is a linkage for raising and lowering platform 130 as door 134 is opened and closed. The linkage includes first and second platform bosses 150 and 152 mounted at opposite sides of the platform. A first beam 154 is pivotally attached to first boss 150 and also to first actuator arm 136 through an opening in a first side wall 156. A second beam 158 is similarly joined to second boss 152 and second actuator arm 138.

Figure 11:
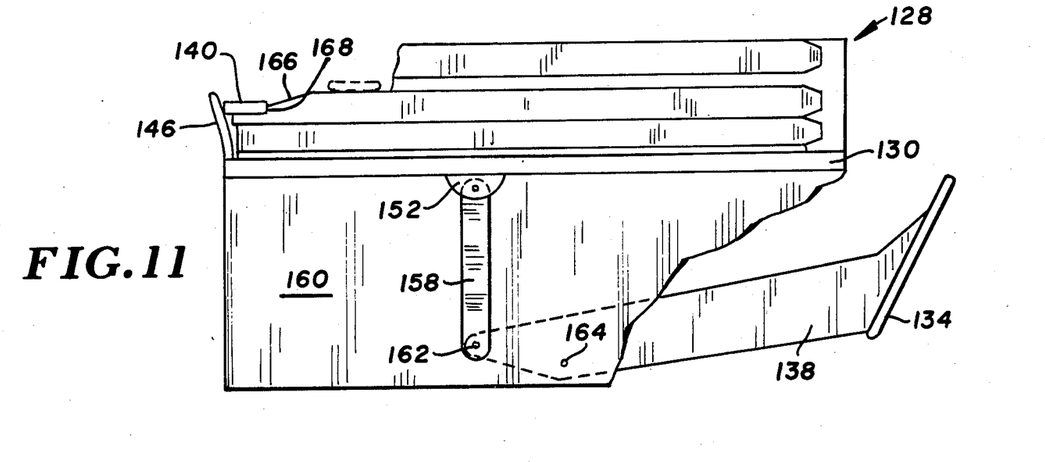
FIG. 11 is a sectional view taken along the line 11—11 in FIG. 10 and showing the disk drive with its door open.
Figure 12:
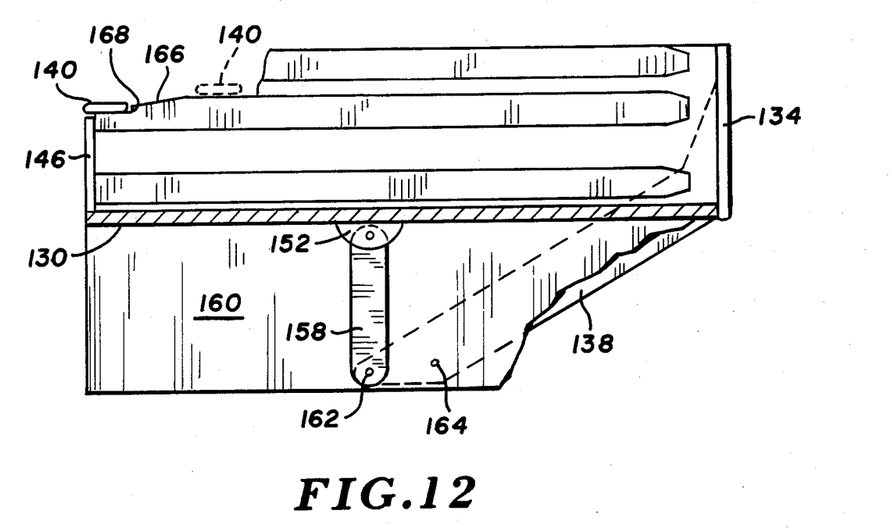
FIG. 12 is a sectional view taken along the line 11—11 in FIG. 10 showing the disk drive with its door closed.

Operation of the linkage is move clearly understood from FIGS. 11 and 12, both showing a second side wall 160 as viewed from inside drive 128. FIG. 11 shows door 134 open, after the complete insertion of a cartridge into drive 128. Actuator arm 138 is attached to beam 158 at a beam pivot 162, and also is attached to second side wall 160 at an actuator pivot 164. The opposed linkage including first beam 154 and first actuator arm 136 is substantially identical.

Eject lever 140 is shown in it loaded position, after being pushed rearward by the cartridge and down a ramp 166. In the loaded position, the eject lever biases eject spring 146 rearwardly out of its normal, unstressed configuration, and itself is held in place by a step 168, against the force of coil spring 144.

In FIG. 12, the door is closed. Rotation of actuator arm 138 about actuator pivot 164 has brought beam pivot 162 downwardly to lower platform 130. Also eject spring 146, lowered with the platform, is in its normal, vertical configuration, free of eject lever 140.

Figure 13:
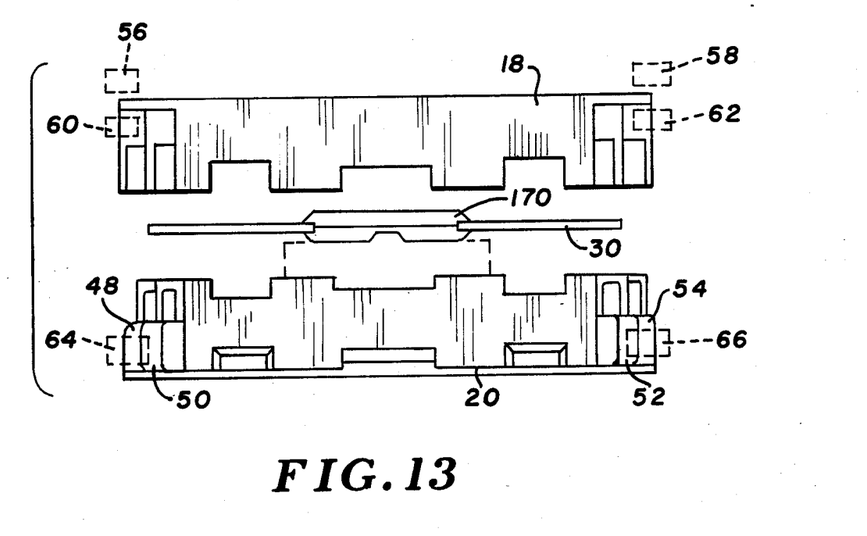
FIG. 13 is a forward view of the cartridge similar to that in FIG. 2 but with the cartridge sections disengaged.

FIG. 13 shows the position of disk cartridge sections 18 and 20 when the cartridge is mounted in drive 128 and door 134 is closed. Bottom section 20, having been lowered along with platform 130, is totally separated from top section 18. Disk 30, retained in a hub 170 which in turn is drivably engaged with spindle 132 (broken lines), is held free from both cartridge sections for rotation with the spindle.

Figure 14:
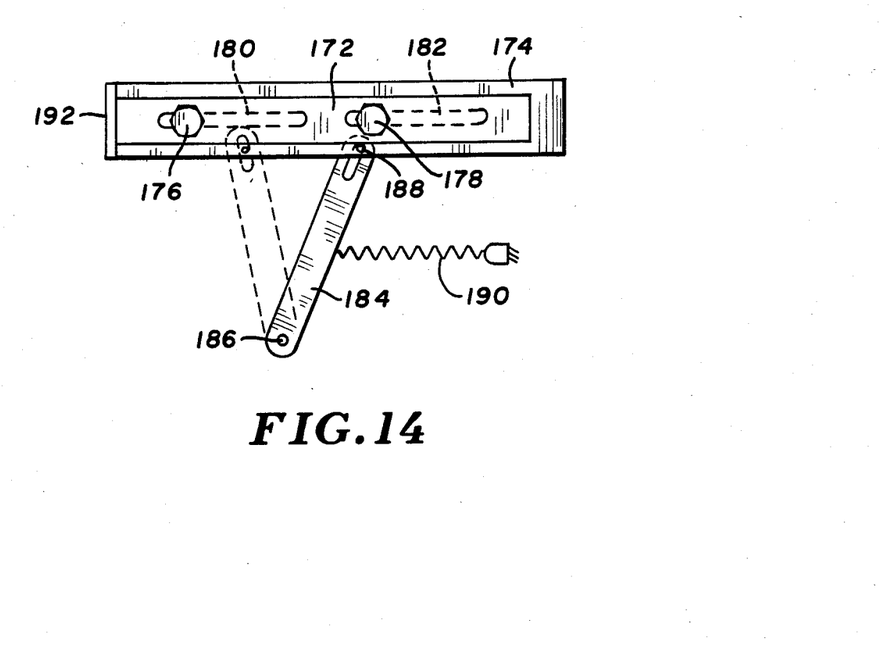
Figure 15:
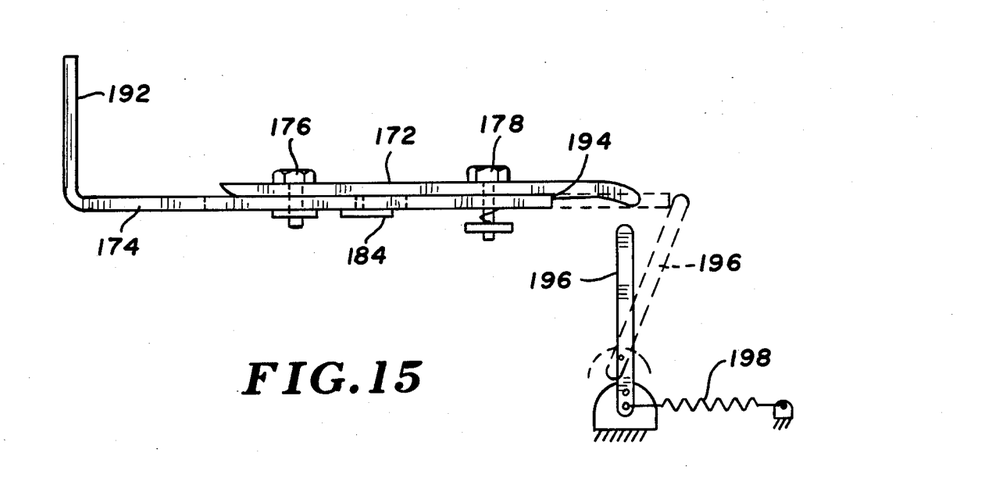

An alternative eject mechanism, shown in FIGS. 14 and 15, includes an elongate guide 172 attached to drive 128, and an eject member 174 mounted slidably to guide 172 by bolt assemblies 176 and 178 extended through elongate slots 180 and 182 in member 174. An eject arm 184, pivotally mounted to drive 128 and member 174 at points 186 and 188 respectively, is biased by an eject arm spring 190 to urge member 174 forward. When inserted, cartridge 16 contacts an upright portion 194 of member 174, then moves the member backward against the force of spring 190 until the member engages a latch 194 of guide 172, which retains the member in a loaded position, as seen in FIG 15.

A release member comprising a link 196, pivotally mounted to platform 130 and biased to an upright position by an eject coil spring 198, moves from a slanted position ahead of guide 172 (broken lines) to its upright, member disengaging position when platform 130 is lowered. Subsequent raising of platform 130 causes link 196 to lift guide 172, freeing member 174 from latch 194 so that it ejects cartridge 16 in response to the force of eject arm spring 190.

In operation, cartridge 16 is inserted into drive 128 with door 134 open as viewed in FIG. 11. First top flange 32 is captured between first top rail 56 and first intermediate rail 60, while second top flange 34 is captured between rails 58 and 62. Simultaneously bottom flanges 36 and 38 are captured beneath their associated bottom rails. As cartridge 16 is further inserted, second and third legs 50 and 52 contact stops 149 and 147, respectively; and first and fourth legs 48 and 54 contact the ends of rails 64 and 66.

Also, front rib 40 contacts eject lever 140 (or, in the alernative embodiment, eject member 174). Continued insertion moves the cartridge while all four locking detents are held in place. In effect, all four locking detents are moved relative to the cartridge to disengage each locking detent from its associated locking jambs, thus freeing cartridge sections 18 and 20 for a vertical movement relative to each other.

Also during insertion, eject lever 140 is moved against the force of coil spring 144, down ramp 166 and finally into the loaded position behind step 168. As the lever is moved into the loaded position, it bends eject spring 146 elastically out of its normal configuration. Step 168 holds eject lever 140 securely in the loaded position, against the force from eject spring 146 and coil spring 144. (In the case of the alternative mechanism, eject member 174 is similarly moved into the loaded position.) The four stops prevent insertion of cartridge beyond a point where hub 170 is substantially aligned with spindle 132.

At this stage, door 134 is moved from the open to the closed position. This causes actuator arms 136 and 138 to rotate about their respective actuator pivots, bringing first and second beams 154 and 158 downward and lowering platform 130. Bottom section 20, with its flanges 36 and 38 captured beneath rails 64 and 66, follows the platform as it is lowered and becomes completely detached from top section 18. Disk 30 follows the movement of bottom section 20 until hub 170 engages spindle 132. Further downward movement of bottom section 20 separates it from the disk, freeing the disk for rotation. Lowering the platform also frees eject spring 146 from behind eject lever 140. The spring returns to its normal configuration, positioned to later remove eject lever 140 from behind step 168 when platform 130 is raised once again. (When the alternative mechanism is employed, it is link 196 which becomes positioned to remove member 174 from latch 194.)

To unload cartridge 16 from drive 128, the operator merely opens door 134. This pivots actuator arms 136 and 138 to raise beams 154 and 158, thus returning platform 130 to the raised position. Prior to reaching the raise position, platform 130 contacts hub 170 and disengages it from the spindle. Continued platform movement joins top and bottom sections 18 and 20 once again.

As platform 130 is being raised, it brings eject spring 146 into contact with the bottom of eject lever 140. Upon further upward movement of platform 130, eject spring 146 pushes lever 140 upward and outward from behind step 168, whereupon it responds to the force of coil spring 144 to eject cartridge 16 partly out of drive 128. It then may be easily removed by hand. For the alternative eject mechanism, link 196 contacts guide 172 to disengage member 174 from latch 194.

The disclosed cartridge and drive together comprise a safe and efficient system for reading and recording information on optical disks. During reading and recording operations, the top and bottom sections of the drive are completely separated and free of the disk to guarantee rotation free of any interference from the cartridge. When the cartridge is removed from the drive, the locking assemblies maintain the sections engaged with one another to protect the disk and insure operator safety. Simple, reliable loading and unloading is accomplished when cartridge sections engage and disengage from one another in a direction parallel to the axis of disk rotation, moved by a platform in the drive mounted to travel in that direction. The rails, which guide the cartridge as it is inserted into the drive, also separate the cartridge sections as the door is being closed.

What is claimed is:

1. A memory cartridge assembly including: a rotatable disk; a cartridge having first and second cartridge sections which, when engaged, enclose said disk within said cartridge; a means for maintaining said first and second sections releasably engaged with one another, including:

a plurality of first locking jambs intergral with said first cartridge section;
a plurality of second locking jambs intergral with said second cartridge section, each second jamb being positioned proximate and associated one of said first jambs when said cartridge sections are engaged;

a locking detent associated with each pair of first and second jambs;

and a biasing means for urging each detent into a locking engagement with its associated pair of locking jambs;

movement of said detents out of said locking engagement against the force of said biasing means disengaging said first and second cartridge sections.

2. The cartridge assembly of claim 1 wherein said first jambs comprise first locking fingers, and said second jambs comprise second locking fingers.

3. The cartridge assembly of claim 2 wherein said locking fingers are elongate and extended in a direction parallel to the plane of said disk, the first and second fingers of each pair being parallel to one another, and wherein each detent is adapted to move longitudinally of its associated locking fingers into and out of said locking engagement.

4. The cartridge assembly of claim 3 wherein each said detent comprises a sleeve that surrounds its associated first and second locking fingers when in locking engagement therewith.

5. The cartridge assembly of claim 4 wherein the first locking finger of each pair is longer than the second locking finger, and said detent, when out of said locking engagement, is retained on said first locking finger and removed from said second locking finger.

6. The cartridge assembly of claim 2 wherein said fingers and said biasing means are contained within said cartridge, each of said detents being substantially contained therein and having a leg extended away from the remainder of the detent and outside of said cartridge through an associated opening in said cartridge, allowing movement of said detent out of said locking engagement from outside of said cartridge.

7. The cartridge assembly of claim 6 wherein said locking fingers are elongate and extended in a direction parallel to the plane of said disk, said first and second fingers of each pair being parallel to one another, and wherein each detent slides longitudinally of its associated locking fingers into and out of said locking engagement, said leg being elongate and oriented parallel to its associated locking fingers.

8. The cartridge assembly of claim 7 wherein the remainder of each said detent comprises a sleeve that surrounds its associated first and second locking fingers when in locking engagement therewith.

9. The cartridge assembly of claim 8 wherein the first locking finger of each pair is longer than the second locking finger, and said detent, when out of said locking engagement, is retained on said first locking finger and removed from said second locking finger.

10. The cartridge assembly of claim 9 including a first support attached to each detent and a second support attached to said first cartridge section and associated with each of said first supports, and wherein said biasing means comprises a coil spring contained between said first and second supports.

11. The cartridge assembly of claim 3 including a means for limiting the travel of said cartridge sections, when at least nearly engaged, to travel perpendicular to the plane of said disk and wherein all of said locking fingers are parallel.

12. The cartridge assembly of claim 11 wherein said limiting means includes a first wall running along the perimeter of said first cartridge section and perpendicular to the plane of said disk, and a second wall running along the perimeter of set second cartridge section and perpendicular to the plane of said disk, said walls cooperating to so limit cartridge section travel.

13. The cartridge assembly of claim 12 wherein said first and second walls define a plurality of channels, each channel confining one of said detents and guiding movement of its associated detent.

14. The cartridge assembly of claim 1 wherein each of said first jambs comprises a first edge of a first slot formed in said first cartridge section, and each of said second jambs comprises a second edge of a second slot formed in said second cartridge section, and wherein said first and second slots are aligned when said first and second cartridge sections are engaged.

15. The cartridge assembly of claim 14 wherein each detent is mounted with respect to said first cartridge section to pivot into and out of said locking engagement, each detent being substantially contained within said cartridge and having a leg extended away from the remainder of the detent and outside of said cartridge through an associated opening in said cartridge, allowing movement of said detent out of said locking engagement from outside of said cartridge.

16. The cartridge assembly of claim 15 wherein each of said detents includes a protrusion for entering said first and second slots and contacting said first and second edges to form said locking engagement.

17. The cartridge assembly of claim 16 wherein each of said biasing means comprises a leaf spring mounted to said first cartridge section and contacting its associated detent.

18. The memory cartridge assembly of claim 2 in combination with:

a disk drive housing and means defining an anterior opening through which said cartridge is insertable into the housing, a spindle mounted in said housing and adapted to drivingly engage said disk for rotation about a central axis;

said housing including a release means for contacting said detents when said cartridge is inserted into said housing, and for moving said detents out of locking engagement against the force of said biasing means upon further cartridge insertion, thereby disengaging said first and second cartridge sections.

19. The cartridge assembly of claim 18 wherein said fingers and said biasing means are contained within the cartridge, each of said detents being substantially contained therein and having a leg extended away from the remainder of the detent and outside of said cartridge through an associated opening in said cartridge;

said release means including a plurality of stops mounted with respect to the housing, one stop associated with each detent and positioned to contact the leg of said detent when said cartridge is being inserted into said housing.

20. A disk drive apparatus including:

a housing, and means defining an anterior opening through which a disk cartridge is insertable into the housing, a spindle mounted in said housing and adapted to drivably engage a disk carried in the cartridge, and to rotate said disk about a central axis;

a platform in said housing and movable axially with respect to the housing between first and second platform positions;

means defining a first guideway intergral with said platform;

means defining a second guideway intergral with said housing;

said cartridge having first and second cartridge sections separable from one another, said first section including means for joining the first section with said first guideway as the cartridge is inserted into said housing, said second cartridge section including means for joining the second section with said second guideway as the cartridge is inserted into said housing with the platform in said first platform position;

a stop means for preventing further insertion of said cartridge beyond a point where said disk is substantially aligned with and axially spaced apart from said spindle;

a means for moving said platform from said first platform position toward said second platform position, thereby to separate said first cartridge section and said disk from said second cartridge section and to carry them toward said spindle until said disk is drivably engaged therewith, further platform movement toward said second platform position separating said first cartridge section from said disk.

21. The disk drive apparatus of claim 20 wherein said means defining said first guideway includes two first rails mounted with respect to opposite sides of said platform, and said means defining said second guideway includes two second rails on opposite sides of said housing, and wherein said means for fixing said first cartridge section in said first guideway includes two flanges extending from opposite sides of said first section, and said means for fixing said second cartridge section in said second guideway includes two flanges extended from opposite sides of said second cartridge section, contact between said flanges and their respective rails tending to maintain said cartridge sections in their respective guideways.

22. The disk drive apparatus of claim 20 wherein said cartridge includes a locking means for maintaining said first and second cartridge sections engaged with one another, and wherein said housing includes a means for releasing said locking means to enable separation of said cartridge sections when said cartridge is fully inserted into said housing.

23. The disk drive apparatus of claim 22 wherein said locking means includes a plurality of locking assemblies, each assembly including a first locking finger intergral with said first cartridge section, a second locking finger intergral with said second cartridge section and proximate said first finger whenever said cartridge sections are engaged, and a locking detent movable into and out of locking engagement with said first and second locking fingers and, when lockingly engaged, substantially preventing any movement of said fingers away from one another in the axial direction.

24. The disk drive apparatus of claim 23 including a biasing means in each locking assembly for urging its associated locking detent into locking engagement with its associated fingers, insertion of said cartridge into said housing moving said detents into contact with said release means, further insertion of said cartridge moving said detents out of said locking engagement against the force of said biasing means.

25. The disk drive apparatus of claim 20 wherein said platform, when moved from said second platform position toward said first platform position and with said disk so drivably engaged, disengages said disk from said spindle.

26. The disk drive apparatus of claim 20 including a mechanism for ejecting the cartridge from the housing, said mechanism comprising:

an eject member movably mounted to the housing;

a spring means for biasing said lever in a first direction;

a means for retaining said eject member in a loaded position against the force of said spring means, the full insertion of said cartridge into said housing moving said member into engagement with said retaining means;

a release member mounted to said platform and positioned adjacent said eject member when said platform is in its first platform position, movement of the platform to said second platform position carrying said release member to a member disengaging position, wherein subsequent movement of the platform from said second platform position toward said first platform position causes said release member to disengage said eject member from said retaining means and thereby permit the eject member, responsive to said spring means, to eject said cartridge from the housing.

* * * * *